United States Patent [19]
Krohn et al.

[11] Patent Number: 4,726,630
[45] Date of Patent: Feb. 23, 1988

[54] THRUST-CONTROL DEVICE FOR A MOTOR VEHICLE

[75] Inventors: Hellmut Krohn, Esslingen; Werner Kruse, Schorndorf; Jürgen Frank, Reichenbach, all of Fed. Rep. of Germany

[73] Assignee: Daimler-Benz Aktiengesellschaft, Stuttgart, Fed. Rep. of Germany

[21] Appl. No.: 912,321

[22] Filed: Sep. 29, 1986

[30] Foreign Application Priority Data

Sep. 27, 1985 [DE] Fed. Rep. of Germany ....... 3534443

[51] Int. Cl.⁴ .......................... B60T 8/40; B60T 8/36
[52] U.S. Cl. .................................. 303/119; 303/116; 180/197
[58] Field of Search ........................ 180/197; 188/181; 303/10, 57, 93, 97, 103, 105, 110, 111, 113–116, 119

[56] References Cited

U.S. PATENT DOCUMENTS

| | | | |
|---|---|---|---|
| 4,509,802 | 4/1985 | Solleder et al. | 303/57 |
| 4,589,511 | 5/1986 | Lieber | 180/197 |
| 4,602,824 | 7/1986 | Nishimura et al. | 303/116 |
| 4,648,663 | 3/1987 | Nomura et al. | 303/116 |

*Primary Examiner*—Andres Kashnikow
*Assistant Examiner*—Timothy Newholm
*Attorney, Agent, or Firm*—Barnes & Thornburg

[57] ABSTRACT

A thrust-control device for a motor vehicle having wheels driven on one axle, with a dual-circuit brake system having a tandem main brake cylinder and a brake booster supplied from a special auxiliary pressure source, with an anti-lock system having a brake-pressure medium return device, and with a pressure accumulator serving for thrust control, is extended for use on vehicles with a connectable or permanent all-wheel drive, to the effect that a stop valve is arranged in the brake circuit of the wheels of the further axle and there is a control valve controlling the accumulator pressure and acting on a pressure modulator, the pressure modulator influencing the brake pressure in the brake circuit of the wheels of the further axle when the drive of these wheels is connected and drive slip occurs. This simple extension requires no additional accumulator and makes it possible to preserve the independence of the brake circuits.

17 Claims, 1 Drawing Figure

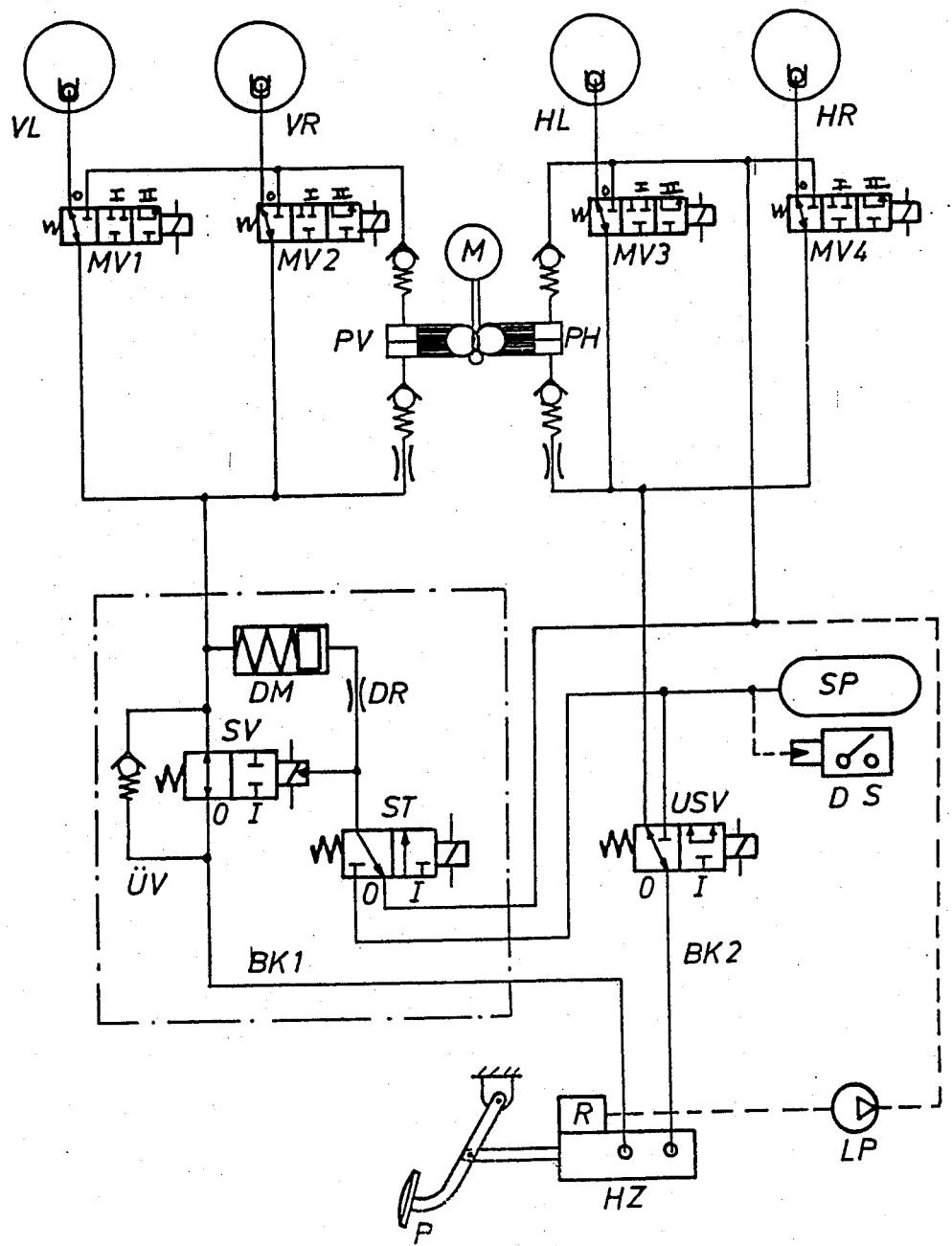

THRUST-CONTROL DEVICE FOR A MOTOR VEHICLE

BACKGROUND AND SUMMARY OF THE INVENTION

The invention relates to a thrust-control device for a motor vehicle having a dual circuit brake system with a drive slip control system (ASR) effective during driving of the wheels and an anti-locking system (ABS) effective during braking of the wheels.

A device of this type is described in German Published Unexamined Application (Offenlegungsschrift) No. 3,137,287. It is intended for a vehicle with wheels driven on one axle.

Thrust-control devices are also known for vehicles with all-wheel drive.

Thus, for example, the previously published German Offenlegungsschrift No. 3,421,776 describes a multiple-circuit braking system in which the operation of the drive-slip control (ASR) can be superposed on the operation of the anti-lock system (ABS). In this case, the pressure accumulator serves also for the purpose of intensifying the braking pressure in the course of pedal-controlled braking. In the case of the drive-slip control, the main cylinder is pressurized by means of a solenoid valve connected upstream. Such pressure is then transmitted dynamically to the wheels of one axle. The other axle is placed under static pressure by means of a main cylinder piston. The magnitude of the pressure at the wheel brakes is determined by the control valves associated with the wheels.

In order to prevent exhaustion of the static brake circuit, brake fluid can be supplied via a reversing valve from a dynamic circuit.

A problem with braking systems of this kind is that, in the event of failure of the external pressure source, not only the intensification of braking pressure fails; the dynamic circuit can also no longer be pressurized. In addition to this, the ABS and ASR controls are also affected by the failure of the external pressure source. Their operation cannot be maintained any longer.

Accordingly, the coupling involves serious technical problems, since the driver is surprised by unusual behavior of the vehicle.

In contrast to this, the object of the invention is to develop a thrust-control device which uses a special auxiliary pressure source (vacuum source) for the brake booster and which provides a special pressure accumulator for the thrust control, in such a way that the arrangement can also be used for the thrust control of vehicles with all-wheel drive.

According to the invention this object is achieved by providing a pressure accumulator operative during drive-slip control operation of the vehicle for controlling the spinning of the wheels and a stop valve and control valve for controlling the connection between the pressure accumulator and the wheels of the axle that is not directly driven in a two wheel drive motor vehicle. In the case of two wheel drive, the stop valve and control valve connect the main brake cylinder and the wheels not directly driven. In a four wheel drive, the stop valve and control valve connect the pressure accumulator and the wheels that are now directly driven. This same arrangement may be used for both two and four wheel drive vehicles.

One particular advantage of the invention is that a device for a single-axle drive can be extended by only small additional means to vehicles with a multi-axle drive, without requiring an additional pressure accumulator and while preserving the independence of the brake circuits. If the pressure accumulator fails, only the drive-slip control is affected, whereas normal braking and anti-lock braking continue to function.

Further objects, features and advantages of the present invention will become more apparent from the following description when taken with the accompanying drawings, which show for purpose of illustration only, an embodiment constructed in accordance with the present invention.

BRIEF DESCRIPTION OF THE DRAWING

The diagrammatic drawing illustrates the dual-circuit brake system of a motor vehicle with all-wheel drive (permanent or connectable) which is equipped with an anti-lock system (ABS) and with a drive-slip control (ASR) for all four wheels.

DETAILED DESCRIPTION OF THE DRAWING

A main brake cylinder HZ (with a differential piston) which can be actuated by a brake pedal P generates, in a known way, the brake pressure which can be transmitted, via first brake circuit BK1, to the wheel brakes VL and VR of the front wheels and, via a second brake circuit BK2, to the wheel brakes HL and HR of the rear wheels.

A 3/2-way valve is arranged as a reversing valve USV in the common delivery line of the second brake circuit BK2 and, in its position of rest or zero position (position), connects the main brake cylinder HZ to the wheel brakes HL and HR. In the working position (position I), the reversing valve USV isolates the wheel brakes from the main brake cylinder and connects them to a pressure accumulator SP. Arranged in each of the delivery lines of all the wheels is a regulating valve MV1 to MV4 which is designed as a 3/3-way valve and which, controlled by the signals from the electronics (not shown), makes it possible to increase the brake pressure in the wheel brakes (position 0), keep it constant (position I) or reduce it (position II). For each brake circuit, the brake pressure medium released when the pressure is reduced is conveyed to the delivery side of the regulating valves or back into the main brake cylinder by a special self-priming pump PV or PH driven by a common electric motor. This return can also feed into the pressure accmulator SP in the second brake circuit, if the reversing valve is set to the working-position (position I). However, the pressure accumulator SP can also be charged from the brake-pressure medium reservoir via a charging pump LP controlled by a pressure switch DS, as indicated by broken lines. In this case, the charging pump LP conveys brake-pressure medium to the suction side of the pump PH which is turn charges the pressure accumulator SP in the above-described way via the reversing valve USV which is in the working position (position I).

The diagrammatic drawing does not illustrate or designate any of the elements which do not contribute anything to the principle of the invention, such as non-return or relief valves, screens or filters, etc. Consequently, there is also no brake booster shown.

The device, as described up to now, is known in its function as a normal brake and an ABS brake for all four wheels and as a drive-slip control for the driven wheels of one axle (here the rear axle).

In order to extend the device to a drive-slip control of all the wheels in a connectable or permanent all-wheel drive, there is arranged in the common brake-pressure line BK1 of the other first brake circuit a stop valve SV which is designed as a 2/2-way valve and which, in the position of rest (position 0), connects the main brake cylinder to the wheel brakes VL and VR or their regulating valves MV1 and MV2 and, in the working position (position I), isolates it from them. Furthermore, there is a pressure modulator DM acting on the brake pressure of this brake circuit BK1 between the stop valve SV and the regulating valves MV1 and MV2. A control valve ST controls this pressure modulator and is designed as a 3/2-way valve. The control valve ST is controlled electromagnetically by the signals from the drive-slip control electronics, such that, as shown in this particular embodiment, the stop valve SV is controlled by the accumulator pressure that is switched to the stop valve SV by the control valve ST in its working position (position I). The control valve ST connects the pressure modulator DM to the suction side of the return pump PH of the second brake circuit BK2 in its position of rest (position 0) and to the pressure accumulator SP in its working position (position I).

A throttle point DR is located in front of the pressure modulator, so that, when the control valve switches to the working position, the stop valve is likewise first moved into the working position, before the pressure modulator can influence the brake pressure in the first brake circuit. For safety reasons, the stop valve SV is bridged by a pressure relief valve UV which transmits in the direction of the main brake cylinder HZ.

The elements serving to ensure the extension are combined inside a box formed by dot-and-dash lines.

The mode of operation of the control device described is as follows:

(a) Normal braking: all the valves remain in the position of rest shown. Pressure in the main brake cylinder HZ generated as a result of pedal pressure is transmitted directly to the wheel brakes. The return flow of the brake-pressure medium follows the same path.

(b) Brakes with ABS function: the valves USV, ST and SV remain in the position of rest shown. Pressure in the main brake cylinder HZ generated as a result of pedal pressure is transmitted directly to the wheel brakes and, when there is a danger of locking of one or more wheels, is regulated in the known way by the corresponding regulating valves MV1 to MV4. When the pressure is reduced, the brake-pressure medium released is conveyed back to the delivery side of the regulating valves or into the main brake cylinder via the return pumps PV, PH.

(c) Drive-slip control on the rear wheels, that is to say when the all-wheel drive is not connected: the reversing valve USV moves into the working position, and the control valve ST remains in the position of rest. Accumulator pressure is transmitted from the pressure accumulator SP via USV to the regulating valves MV3 and MV4 and is regulated according to the ASR signals from the control electronics. The regulating valve of a wheel which is not to be braked moves into position I, with a result that the wheel brake is isolated from the pressure accumulator. When the pressure is reduced (position II), the brake-pressure medium released is conveyed back into the pressure accumulator SP via the return pump PH and the reversing valve USV.

(d) Drive-slip with the all-wheel drive connected: the reversing valve USV and control valve ST move into the working position. Consequently, the stop valve SV also moves into the working position. Both brake circuits are consequently isolated from the main brake cylinder HZ. The second brake circuit BK2 is connected to the pressure accumulator SP via USV, while in the first brake circuit BK1 the pressure accumulator SP causes a pressure build-up via the control valve ST, the throttle DR and the pressure modulator DM, without brake-pressure medium passing from one brake circuit into the other. The regulating valves of the wheels not to be braked move into position I in this phase. As in the braking operation with the ABS function or according to ASR logics, brake-pressure medium released when the pressure is reduced is conveyed via the return pumps PV and PH to the delivery side of the regulating valves of the particular brake circuit and, in a second brake circuit, further back into the pressure accumulator via the reversing valve USV.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Thrust-control device for a motor vehicle having wheels driving on one axle with a dual-circuit brake system having a tandem main brake cylinder connected to wheel brakes for each wheel via plurality of brake circuits and a brake booster supplied from a special auxiliary pressure source and with an anti-lock system comprising a regulating valve means in said brake circuit for each wheel brake and a brake-presure medium return means for each brake circuit; a pressure accumulator means for the thrust control of the driven wheels via their regulating valves; a reversing valve means connected to the brake pressure medium return means of the driven wheels and being operable during drive-slip control to be switched from a position in which the medium return means is connected to said main brake cylinder means to a position in which the medium return means is connected to said accumulator means of the driven wheels of a further axle, there is a stop valve arranged in a brake-pressure line of the brake circuit assigned to these latter wheels; the stop valve means is a 2/2-way valve which, in a position of rest, connects the main brake cylinder to the latter wheel brakes and, in a working position, isolates the main brake cylinder from these latter wheels; a pressure modulator means acting on the brake pressure in a brake circuit between the stop valve means and the regulating valve means of these latter wheels; a control valve means for controlling the pressure modulator means; the control valve means being a 3/2-way valve controlled in synchronism with the stop valve means and which connects the pressure modulator means to a suction side of the brake-pressure medium return means of the driven wheel, in a position of rest and to the pressure accumulator means in a working position.

2. Thrust-control device according to claim 1, wherein the stop valve means is coupled mechanically to the control valve means.

3. A thrust control device according to claim 2, wherein each regulating valve means exhibits three positions for respectively increasing, holding constant and reducing the braking signal and the pressure signal from the brake circuits.

4. Thrust-control device according to claim 1, wherein the stop valve means and the control valve means are actuated electromagnetically.

5. A thrust control device according to claim 4, wherein the regulating valve means assigned to the latter set of wheels is connected to the pressure accumulator means by the control valve means during the drive-slip control operation of the latter axle.

6. A thrust control device according to claim 5, wherein the pressure modulator means is arranged between the control valve means and the regulating valve means assigned to the latter set of wheels.

7. A thrust control device according to claim 6, wherein the control valve means and the stop valve means are controlled simultaneously by the pressure accumulator measn in the drive-slip control operation of the latter axle.

8. A thrust control device according to claim 7, wherein the pressure accumulator means is operatively connected to the pressure modulator means during the drive-slip control operation.

9. A thrust control device according to claim 8, wherein the pressure modulator means is connected to the suction side of a brake pressure medium return device of the driven wheel when the control valve means is in a position of rest during the braking operation of the latter wheel brake.

10. A thrust control according to claim 9, wherein the stop valve means is coupled mechanically to the control valve means.

11. A thrust control according to claim 9, wherein the stop valve means and the control valve means are actuated electromagnetically.

12. A thrust control according to claim 9, wherein a throttle is provided in the connection controlled by the control valve means and the pressure modulator.

13. A thrust control according to claim 9, wherein the stop valve means which is bridged by a pressure relief valve which transmits in the direction toward the main brake cylinder.

14. Thrust-control device according to claim 1, wherein the stop valve means is controlled by pressure in the accumulator means in response to the position of the control valve means; and wherein a throttle is provided from the pressure modulating means in the connection controlled by the control valve.

15. Thrust-control device according to claim 1, wherein the stop valve means is bridged by a pressure relief valve which transmits in the direction toward the main brake cylinder.

16. A thrust control device for switchable from two to four wheel drive and motor vehicles having a dual-circuit brake system, comprising:
a first set of two wheels driven on a first axle;
a second set of two wheels driven on a second axle;
main brake cylinder means responsive to a brake pedal for generating a braking signal;
pressure accumulator means for generating a pressure signal for controlling the rotation of the wheels during drive-slip control operation of the individual axles of the vehicle;
first and second brake circuit means assigned to the first and second sets of wheels respectively, for receiving a braking signal from the main brake cylinder and transmitting the braking signal to the sets of wheels during the braking of the individual axles of the vehicle, and for receiving a pressure signal from the pressure accumulator means and transmitting the pressure signal to the sets of wheels during the drive-slip control operation of the individual axles of the vehicle;
regulating valve means assigned to each of the sets of wheels for regulating the braking signal from the brake circuit means to the wheels during braking of each of the individual axles of the vehicle, and for regulating the pressure signal from the brake circuits to the wheels during drive-slip control operation of each of the individual axles to the vehicle;
reversing valve means for operatively connecting the regulating valve means assigned to the second set of wheels to the main brake cylinder during the braking of the second axle and to the pressure accumulator means during the drive-slip control operation of the second axle;
stop valve means for operatively connecting the regulating valve means assigned to the first set of wheels to the main brake cylinder means during the braking of the first axle;
control valve means for operatively connecting the regulating valve means assigned to the first set of wheels to the pressure accumulator means during drive-slip control operation of the first axle, said control valve means controlling the position of the stop valve means; and
wherein, when only the second axle is directly driven, the control valve means controls the stop valve means to maintain an operative connection between the regulating valve means assigned to the first set of wheels and the main brake cylinder means and when both axles are directly driven, the control valve means maintains an operative connection between the regulating valve means assigned to the first set of wheels and the pressure accumulator means.

17. A thrust control device for use with a motor vehicle switchable from two to four wheel drive and having one or two driven axles respectively and having an anti-blocking system for regulating the braking pressure from a main brake cylinder during braking and a drive-slip control system driven by a pressure accumulator means for controlling the spinning of the vehicle wheels during acceleration, comprising:
reversing valve means for connecting the wheels of a driven axle of the vehicle to the main brake cylinder during braking of the axle and to the pressure accumulator means during drive-slip control of the axle,
a stop valve means for connecting the main brake cylinder to the wheels of the other axle of the vehicle during braking of said other axle,
a control valve means for controlling the position of the stop valve means and for connecting the pressure accumulator means to
a pressure modulator means which controls a separate pressure input from the main brake cylinder to the wheels of the other axle during drive-slip control of said other axle, said pressure modulator means being arranged between the control valve means and the wheels of said other axle of the vehicle.

* * * * *